United States Patent [19]

Standing

[11] 4,293,106
[45] Oct. 6, 1981

[54] EMERGENCY LOCKING SEAT BELT RETRACTOR

[75] Inventor: David L. Standing, Carlisle, England

[73] Assignee: Kangol Magnet Limited, Carlisle, England

[21] Appl. No.: 74,335

[22] Filed: Sep. 11, 1979

[30] Foreign Application Priority Data

Sep. 11, 1978 [GB] United Kingdom ............... 36311/78

[51] Int. Cl.³ ...................... A62B 35/02; B65H 75/48
[52] U.S. Cl. ...................... 242/107.4 A; 242/107.4 B
[58] Field of Search ................. 242/107.4 A, 107.4 B; 280/806–808; 297/478, 480

[56] References Cited

U.S. PATENT DOCUMENTS

| | | | |
|---|---|---|---|
| 3,482,799 | 12/1969 | Wrighton et al. | 242/107.4 B |
| 4,135,682 | 1/1979 | Mizuno | 242/107.4 B |
| 4,148,446 | 4/1979 | Sugar | 242/107.4 B |
| 4,168,810 | 9/1979 | Sack et al. | 242/107.4 A |

*Primary Examiner*—John M. Jillions
*Attorney, Agent, or Firm*—Young & Thompson

[57] ABSTRACT

A vehicle seat belt retractor has a belt sensitive mechanism with a pawl which is thrown outwardly when a flywheel lags relative to the main shaft to engage an internally toothed wheel. The toothed wheel is received in a coaxial cup member having arms for engaging a lockbar which can engage ratchet wheels fast with the shaft to lock the reel. A spring between radial projections on the toothed wheel and the cup member maintains this in a predetermined angular relation and absorbs movement of the toothed wheel in excess of what is required to operate the lockbar. A pendulum can engage an externally toothed wheel on excessive retractor acceleration to hold this against rotation with the shaft and a resiliently flexible arm extending between this wheel and the flywheel then effects locking by retarding the flywheel. The arm permits the rotation of the flywheel to exceed that of the rotation of the externally toothed wheel.

4 Claims, 3 Drawing Figures

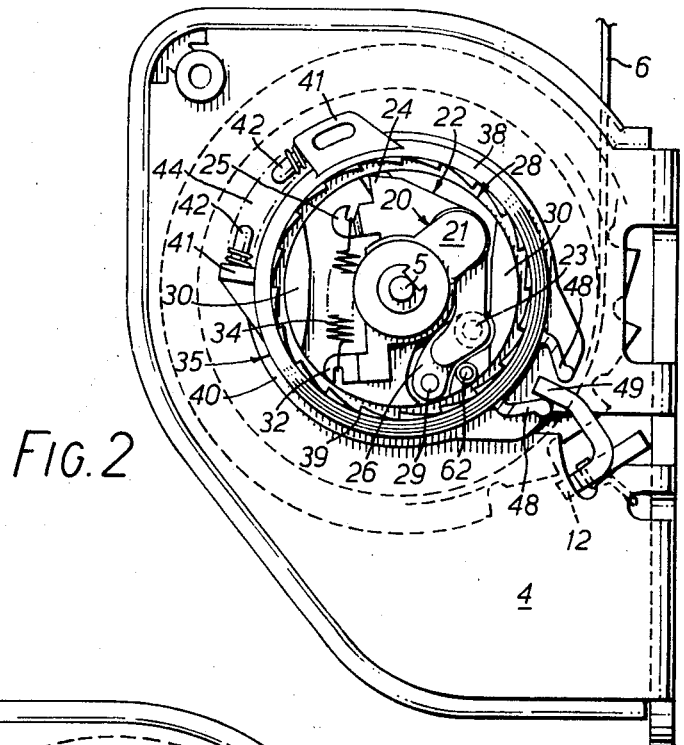

EMERGENCY LOCKING SEAT BELT RETRACTOR

BACKGROUND OF THE INVENTION

The invention relates to an emergency locking vehicle seat belt retractor, and more specifically to a vehicle seat belt retractor having belt storage means from which a belt can be withdrawn in use against a pull imposed by retractor spring means, and an emergency locking mechanism which will lock the retractor against belt withdrawal in response to at least one of a predetermined belt acceleration on belt withdrawal and a predetermined acceleration (which term herein is used to comprehend also deceleration) of the retractor.

Satisfactory operation of such an emergency locking mechanism requires the transmission of mechanical movement, which may be dependent on the circumstances in which locking takes place, between various components of the mechanism, for example, from a first inertia device sensitive to acceleration of the reactor (and thus of a vehicle in which the retractor is secured) to a second inertia device sensitive to belt withdrawal acceleration, and from the second inertia device to a locking device.

It is thus an object of the invention to provide an emergency locking retractor having an emergency locking mechanism capable of accommodating variable mechanical movements therein.

It is a further object of the invention to provide an emergency locking retractor having an emergency locking mechanism comprising mechanically linked units of which the inputs and outputs need not be accurately matched.

SUMMARY OF THE INVENTION

According to the invention, the emergency locking mechanism of a vehicle seat belt retractor is provided with means for accommodating mechanical missmatch therein. The emergency locking mechanism may comprise a locking device, a device responsive to at least one of a predetermined retractor acceleration and a predetermined belt acceleration to operate the locking device, and the means operative to accommodate mismatch can be operative between the acceleration responsive device and the locking device.

The retractor may comprise a rotatable spindle from which the belt is unwound for use and the locking device may comprise a ratchet wheel fixed to the spindle and a pawl movable to engage the ratchet wheel to lock the spindle against rotation in the unwinding direction. It is then desirable to ensure that the locking pawl makes a complete full face contact with the ratchet wheel, so that on occurrence of an emergency condition, locking of the retractor against belt withdrawal is reliably achieved. A certain mechanical input to the locking device is necessary to effect this locking movement and the invention provides for this input to be correctly matched to the operation of the locking device, to ensure that the locking device operates correctly.

In a retractor in which the locking device comprises a pawl and a ratchet connection to a main spindle of the retractor, the acceleration sensing device may have a toothed member movable radially outwardly of the spindle to engage a tooth of an internally toothed annular member rotatable coaxially of the spindle. An output member also rotatable coaxially of the spindle is capable of limited rotation for moving the locking pawl to engage the ratchet to effect locking. The annular and output members are coupled together so that spindle rotation with the toothed member in engagement with the annular member carries the output member round to effect locking by spring means absorbing any further movement of the former member. A lost motion connection is thus provided between the acceleration sensing device and the locking device.

Arrangements functioning to similar effect can of course be provided additionally or instead elsewhere in an emergency locking mechanism in accordance with the invention for example between inertial devices responsive respectively to retractor and to belt acceleration.

Further objects features and advantages of the invention will be readily understood by those skilled in the art from the following illustrative description of one particular embodiment of the invention which is shown in the accompanying drawings.

In the drawings:

FIG. 2 is a side view of the retractor with certain parts omitted for purposes of clarity; and FIG. 3 is a like view with the parts omitted from FIG. 2 included.

Figure 1:
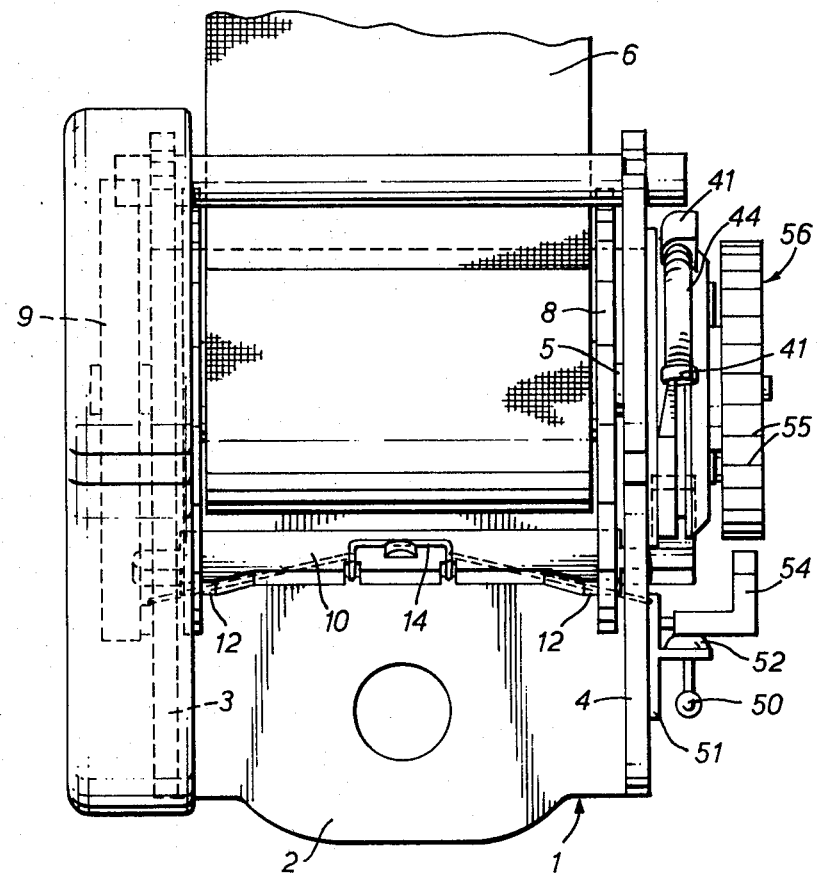
FIG. 1 is a front view of a retractor embodying the invention.

The illustrated seat belt retractor comprises a frame 1 which is generally channel shaped, having a back plate 2 by which the retractor may be mounted in a vehicle, and two side plates 3, 4 having aligned apertures in which a main spindle 5, is journalled. Between the plates 3, 4 the spindle 5 is connected to one end of a length of webbing constituting a seat belt 6 and between the belt and each side plate a ratchet wheel 8 is secured to the spindle to rotate therewith. On the outer side of the side plate 3, a coiled rewind spring 9 has one end secured to a projecting end of the spindle 5 and the other to the frame 1, the spring appying a bias to the spindle tending to cause it to rotate in a sense to wind up the belt into the retractor. A lock bar 10 extends across between the side plates; it is pivoted in aligned apertures therein, and has pawl portions 12 engageable with the teeth of the ratchet wheels 8. A torsional cantilever spring 14 acts between the lock bar and the frame to urge the lock bar to an inoperative position in which the pawl portions 12 are spaced from the ratchet teeth.

It will be understood tht the belt 6 is withdrawn in use from the retractor against the tension of the rewind spring 9, which acts to draw the belt back into the retractor after use. Under emergency conditions, an acceleration sensitive mechanism, described below, acts on the lock bar 10 to engage the pawl portions 12 with the teeth of the ratchet wheels 8 and thereby prevent further withdrawal of the belt, whereby the user of the seat belt is held safely in his seat.

The acceleration sensing mechanism of the illustrated retractor is accommodated on the outer side of the side plate 4 of the frame. The mechanism is constructed so as to actuate the locking mechanism constituted by the lock bar 10 and ratchet wheels 8 in response either to a predetermined acceleration of the retractor, which would result from a sharp deceleration of the vehicle in which the retractor is secured, or to belt withdrawal at a predetermined acceleration. Both such accelerations occur in emergency conditions, as when the vehicle is engaged in a collision with another vehicle or a stationary object. The belt sensitive mechanism is first described.

On a portion of the main spindle 5 projecting beyond the side plate 4, a two armed member 20 is fixed for rotation with the spindle. At a position spaced from the axis of the spindle, one arm 21 of the member 20 pivotally mounts a pawl member 22 which extends from the pivot position generally arcuately around the spindle 5 in one direction to provide an outwardly facing pawl tooth 24 and beyond this a spring connecting portion in the form of an outwardly facing hook 25. The pawl member 22 extends in the opposite direction from the pivot position to a pivotal connection at 23 with a linking lever 26.

A flywheel member 28 freely rotatable on the main spindle underlies the pawl member 22; the linking lever 26 is received in a channel formed in the outer face of the flywheel member and is pivoted thereto at a position 29 radially outwardly of its pivotal connection to the pawl member. The flywheel member 28 has outwardly projecting peripheral portions 30 in which its weight is concentrated.

The other arm of the two arm member 20 secured at the free end of the main spindle projects generally away from the first arm 21 and is formed with a spring connecting portion in the form of an outwardly facing hook 32 at its free end. A light spring 34 extends between the two connecting hooks 25,32 to draw together the two armed member 20 and the pawl member 22 so that the tooth 24 is held at an inwards position.

Surrounding the flywheel member is a cup member 35 having a plate portion and an outwardly facing peripheral flange 38 provided with a plurality of internal ratchet teeth 39, in a position to be engaged by the tooth 24 on the pivoted pawl member 22. Externally of this internally toothed cup member 35, and received in a recess therein, is a ring member 40 which makes a sliding frictional fit with the cup member. Each of the cup and ring members 35,40 is provided with a radially outwardly extending portion 41 provided with a circumferentially extending pin 42. The two pins extend towards each other, and a compression spring 44 has its ends received on them, so as to urge the portions 41 angularly apart. A radially inwardly extending projection (not shown) of the ring member 40 is however received in a recess of the cup member 35, so as to limit this angular movement. Also protruding from the ring member 40 are a pair of arms 48 between which is received an extension 49 of the lock bar 10, such that rotation of the ring member 40 in the anti-clockwise position as shown causes the lock bar to tilt against the return spring 14 into the locking position in which its pawl portions 12 will be engaged by the teeth of the two ratchet wheels 8 within the frame.

In normal use of the retractor, the belt 6 is withdrawn at such a rate that the flywheel member 28 follows the rotation of the main spindle 5. If the belt is withdrawn at too great a rate, as when it is subjected to a sharp pull in the withdrawal direction, the inertia of the flywheel member 28 causes the member to lag on the main spindle. This increases the distance between the pivotal connection 29 of the linking lever 26 to the flywheel member and the pivotal connection of the pawl member 22 to the first arm 21 of the two armed member 20. The lever linkage formed by the linking lever and this arm 21 is thereby lengthened, and the resultant pivotation of the pawl member 22 on the first arm 21 of the two arm member 20 causes the pawl tooth portion 24 to be thrown outwardly against the force of the spring 34, into a position in which it can engage with the ratchet teeth 39 of the cup member 35. Continuing withdrawal of the belt causes the cup member 35 to rotate in the withdrawal direction of the belt because it is now coupled to the spindle 5 through the pawl member 22 and the two armed member 20. The spring coupling between the cup member 35 and the ring member 40 causes the ring member to be carried around with the cup member in the belt unwinding direction, and the arms 48 act on the lock bar 10 to bring its pawl portions 12 into engagement with the ratchet wheels 8 inside the frame, against the action of the return spring 14.

This engagement does not normally immediately prevent further belt withdrawal, because the pawl portions 12 will usually engage the wheels 8 on the sloping ramp surfaces between the generally radially projecting abutment faces of the ratchet teeth. Depending on the position of the engagement on the ramp surfaces, a certain amount of further rotation of the main spindle, and thus of the cup member 35, is required to bring the pawl portions 12 securely against the ratchet teeth abutment faces and thus end rotation of the spindle. To ensure that this abutment takes place, the ring member 40 has to be held in place to maintain the locking position of the pawl portions 12 and further rotation of the cup member 35 consequent upon that of the main spindle 5 has to be accommodated. The relative angular movement of the cup and ring members necessary to this accommodation readily takes place against the force of the spring 44. The cup and ring members thus co-operate to provide a lost motion connection between the locking drive from the main spindle and the pawl portions receiving this drive.

The mechanism which senses acceleration of the retractor, and thus of a vehicle in which the retractor is mounted, effects locking movement of the lock bar 10 through the belt sensitive mechanism in that it acts to hold back the flywheel member during the rotation of the main spindle 5 which inevitably occurs during the emergency conditions giving rise to the retractor acceleration, so that locking results in the same way as if the flywheel member lagged on the spindle through its own inertia.

The mechanism comprises an inertia body 50 in the form of a pendulum suspended from a sub-frame 51 secured on the outer side of the side wall 4 by a stem depending from an annular cap 52, so that the pendulum will tilt about a point on the periphery of the cap only in response to an acceleration above a predetermined amount. When such an acceleration occurs, the cap member 52 engages a lever 54 pivoted on the sub-frame 51 to cause this to pivot and bring a tooth portion thereof into engagement with external ratchet teeth 55 on the rim of a ratchet wheel 56 rotatably secured on the two-armed member 20. The wheel 56 is also connected to the flywheel member 28 by way of a resiliently flexible internal arm 60 thereof, the free end of which is secured to an axially extending part 62 of the flywheel member. Engagement of the lever 54 with one of the teeth 55 stops rotation of the wheel 56 and continuing rotation in the belt withdrawal direction of the flywheel member 28 with the main spindle results in a braking action on the former during which the arm 60 flexes inwardly, functioning as a lost motion connection accommodating mismatch between the operations of the retractor sensitive acceleration mechanism and the belt sensitive mechanism.

It will be evident to those skilled in the art that the present invention can be embodied in a variety of ways different from those specifically described in retractors comprising one or both of retractor and belt acceleration sensitive mechanisms which can themselves differ from those specifically described, without departing from the spirit and scope of the invention.

I claim:

1. A vehicle seat belt retractor, said retractor comprising:

seat belt means;

reel means rotatable in a first direction to wind said seat belt means thereon and in a second direction to unwind said seat belt means therefrom;

spring means urging said reel means to rotate in said first direction;

ratchet means carried by said reel means for rotation therewith;

pawl means movable from a normal inoperative position spaced from said ratchet means to an operative position engaging said ratchet means to prevent rotation of said reel means in said second direction;

a first rotatable member;

means linking said first rotatable member to said pawl means so that rotation of said first rotatable member in a locking direction effects movement of said pawl means to said operative position thereof;

a second member rotatable coaxially of said first rotatable member;

acceleration sensitive means responsive to at least one of a predetermined acceleration of the belt means in the unwinding direction and a predetermined acceleration of the retractor to rotate said second rotatable member in the locking direction;

drive means operable between said first and said second rotatable members so that said rotation of said second rotatable member in the locking direction drives said first rotatable member to rotate in the locking direction, said drive means incorporating spring means acting between said first and said second rotatable members in opposition to said drive to thereby accommodate relative movement of said first and said second rotatable members needed to effect full engagement of said pawl means with said ratchet means.

2. The retractor of claim 1 wherein said drive means comprises a member extending radially outwardly from each of said first and said second rotatable members, said spring means comprising a compression spring received between said radially outwardly extending members.

3. The retractor of claim 2 wherein said compression spring is a coil spring, and said radially outwardly extending members each comprises a circumferentially extending pin means projecting therefrom and received in a respective end of said coil spring.

4. The retractor of claim 1 wherein said first rotatable member comprises a cup-shaped member having rim means and internally projecting teeth on said rim means, said acceleration sensing means comprises a toothed member within said rim means and movable radially outwardly to engage said internally projecting teeth, and said second rotatable member comprises a ring surrounding said rim.

* * * * *